United States Patent
Khatana et al.

(10) Patent No.: US 8,768,178 B2
(45) Date of Patent: Jul. 1, 2014

(54) AUTOMATIC GAIN CONTROL FOR HIGH-SPEED COHERENT OPTICAL RECEIVERS

(75) Inventors: Sunil Kumar Singh Khatana, Sunnyvale, CA (US); George Zarris, San Jose, CA (US)

(73) Assignee: Opnext Subsystems, Inc., San Jose, CA (US)

( * ) Notice: Subject to any disclaimer, the term of this patent is extended or adjusted under 35 U.S.C. 154(b) by 209 days.

(21) Appl. No.: 13/233,969

(22) Filed: Sep. 15, 2011

(65) Prior Publication Data

US 2013/0071109 A1 Mar. 21, 2013

(51) Int. Cl.
*H04B 10/06* (2006.01)
(52) U.S. Cl.
USPC .............................. 398/202; 398/204; 398/206
(58) Field of Classification Search
None
See application file for complete search history.

(56) References Cited

U.S. PATENT DOCUMENTS

| | | | | |
|---|---|---|---|---|
| 2010/0254718 A1* | 10/2010 | Oda et al. | | 398/202 |
| 2011/0129230 A1* | 6/2011 | Zanoni et al. | | 398/140 |
| 2011/0150504 A1* | 6/2011 | Ellis et al. | | 398/203 |
| 2011/0249969 A1* | 10/2011 | Ji et al. | | 398/45 |
| 2012/0251118 A1* | 10/2012 | McNicol | | 398/82 |
| 2013/0004181 A1* | 1/2013 | Juarez et al. | | 398/118 |

OTHER PUBLICATIONS

Maxim Integrated Products, "Optical Signal-to-Noise Ratio and the Q-Factor in Fiber-Optic Communication Systems", Application Note HFAN-9.0.2 (Rev. 1; Apr. 2008), 7 pages.

* cited by examiner

*Primary Examiner* — Ken Vanderpuye
*Assistant Examiner* — Merlin Brito Peguero
(74) *Attorney, Agent, or Firm* — Fenwick & West LLP

(57) ABSTRACT

Feed-forward and feedback strategies are used to control local oscillator power and transimpedance amplifier gain in a high-speed coherent optical receiver.

19 Claims, 6 Drawing Sheets

(FIG. 2)

AUTOMATIC GAIN CONTROL FOR HIGH-SPEED COHERENT OPTICAL RECEIVERS

TECHNICAL FIELD

The disclosure is generally related to high-speed optical coherent receivers and in particular to automatic gain control strategies.

BACKGROUND

Next-generation long-haul, fiber-optic communications systems are being designed to operate at 100 gigabits per second over distances of 1,000 kilometers or more. Coherent optical receivers have been proposed as an alternative to conventional direct detection receivers for high-speed, fiber-optic systems because, among other reasons, they recover the phase of optical electric fields. When in-phase (I) and quadrature (Q) components of an optical signal are known, exact equalization of linear channel impairments is possible in principle and the effects of nonlinear impairments may be reduced.

The performance of a high-speed coherent optical receiver is affected by signal levels in the receiver, among many other factors. Poor control of signal levels can lead to unacceptably high bit-error rates.

FIG. 1A is a block diagram of a coherent optical receiver. In FIG. 1A, incoming optical signal 105 and local oscillator (LO) optical signal 110 are inputs to optical hybrid mixer 115. The optical outputs of the hybrid are converted to electrical signals by photodetectors 120 and the electrical signals are amplified by transimpedance amplifiers 125 before being sent to digital data receiver 130 for demodulation and decoding.

In real-world applications the power of input optical signal 105 can vary. The signal power may depend on network conditions, link design and other factors. The power can fluctuate temporarily as optical channels in a link are added or dropped, for example. Both single-ended and balanced photodetection schemes lead to transimpedance amplifier input signals that are proportional to $Re\{A_{SIG}A^*_{LO}\}$ where $A_{SIG}$ is the optical signal amplitude and $A_{LO}$ is the optical local oscillator amplitude; * denotes complex conjugation. Thus, variable input signal power leads to variable signal levels in a coherent optical receiver.

A transimpedance amplifier has a limited, and predefined, range of input signal levels for which acceptable output signal fidelity is assured. When the input signal to a transimpedance amplifier is too low, the output signal-to-noise ratio is degraded. Conversely, when the input signal level is too high, the output suffers from harmonic distortion.

The input signal level and the gain of a transimpedance amplifier determine its output signal level. In the receiver of FIG. 1A, the output of transimpedance amplifier 125 is sent to digital receiver 130 and, as described in further detail below, analog-to-digital converters (ADC) in the digital receiver convert input signals into data for processing.

Too small signal input to an ADC leads to quantization errors while too large signals are distorted by clipping. (Some ADC signal clipping is acceptable to keep most of the signal energy in the ADC's linear conversion range especially when signals have high peak-to-average ratios.) These constraints lead to a predefined, acceptable ADC input signal range.

Overall performance of a high-speed coherent optical receiver thus depends, in part, on keeping signal inputs to transimpedance amplifiers and analog-to-digital converters within predefined, acceptable ranges. What are needed are coherent optical receiver designs that provide immunity from fluctuations in input optical signal level or variations in transimpedance amplifier gain.

DETAILED DESCRIPTION

Potential performance reduction in a high-speed coherent optical receiver can be prevented by automatic gain control (AGC). AGC helps the receiver avoid the consequences of varying input optical signal levels by adjusting transimpedance amplifier gain automatically to provide optimum input levels for analog-to-digital converters.

The automatic gain control designs described below use both feed-forward and feedback strategies to control optical local oscillator power. This leads to stable optical signal levels in photodetectors and stable electrical signal levels at the input to transimpedance amplifiers. Fast and slow feedback loops are used to control transimpedance amplifier gain, with slow feedback providing set-points for fast feedback control loops. As an example, the set point for a fast, hardware-based feedback loop may be determined by a slower, DSP-based feedback loop.

The description and figures are simplified to emphasize AGC strategies without delving unnecessarily into the details of receiver functional hardware blocks. For example, in a dual-polarization, quadrature phase-shift-keying optical receiver, four (I and Q for each of two polarizations) parallel signal paths connect hybrid, photodetectors, transimpedance amplifiers and analog-to-digital converters. Only one such signal path is described here. Techniques for LO power control are described separately from techniques for transimpedance amplifier gain control; however, they may be used simultaneously.

Figure 1A:
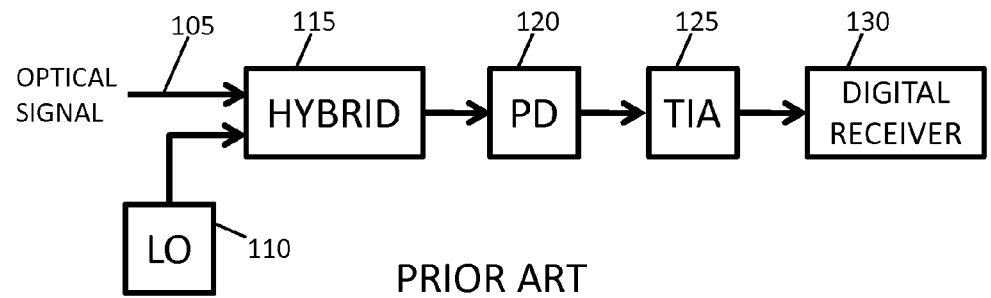
FIG. 1A is a block diagram of a coherent optical receiver.
Figure 1B:
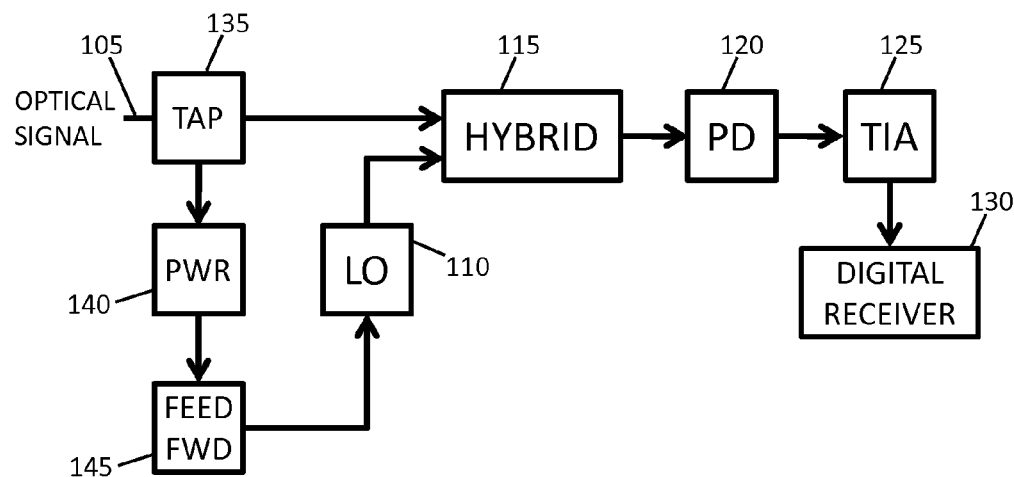
FIG. 1B is a block diagram of a coherent optical receiver with feed-forward local oscillator power control.

FIG. 1B is a block diagram of a coherent optical receiver with feed-forward local oscillator power control. Similar to FIG. 1A, in FIG. 1B, incoming optical signal 105 and local oscillator (LO) optical signal 110 are inputs to optical hybrid mixer 115. The optical outputs of the hybrid are converted to electrical signals by photodetectors 120 and the electrical signals are amplified by transimpedance amplifiers 125 before being sent to digital data receiver 130 for demodulation and decoding.

In FIG. 1B, tap 135 splits off a small fraction of the incoming optical signal for power measurement by photodetector and power measuring block 140. The power measurement from block 140 is then sent to feed-forward controller 145 which in turn adjusts the power of a laser that produces optical local oscillator signal 110. The feed-forward controller allows the power of the LO signal to be a function of the power of the incoming signal: $P_{LO}=f(P_{SIG})$. As a simple example, if $$P_{LO} \propto \frac{1}{P_{SIG}},$$

then the output signal level from photodetectors 120 will be approximately constant.

The feed-forward control loop may have a fast (e.g. 1-100 μs) response time when implemented in dedicated digital logic or analog hardware. Such a system provides rapid response to transients. However, more accurate LO power tuning may be achieved using feedback from a digital data receiver as described below.

High-speed coherent optical receivers like those of FIGS. 1A and 1B employ an electronic digital receiver 130 to demodulate and decode electrical signals from transimpedance amplifier 125. At various points along the path from electrical signal input to digital data output, a digital receiver produces data that can be used to provide feedback to control transimpedance amplifier gain. The connection between internal receiver data and amplifier gain arises because the gain of the amplifier affects analog-to-digital conversion errors which in turn affect the quality of the data on which the digital receiver operates.

Figure 2:
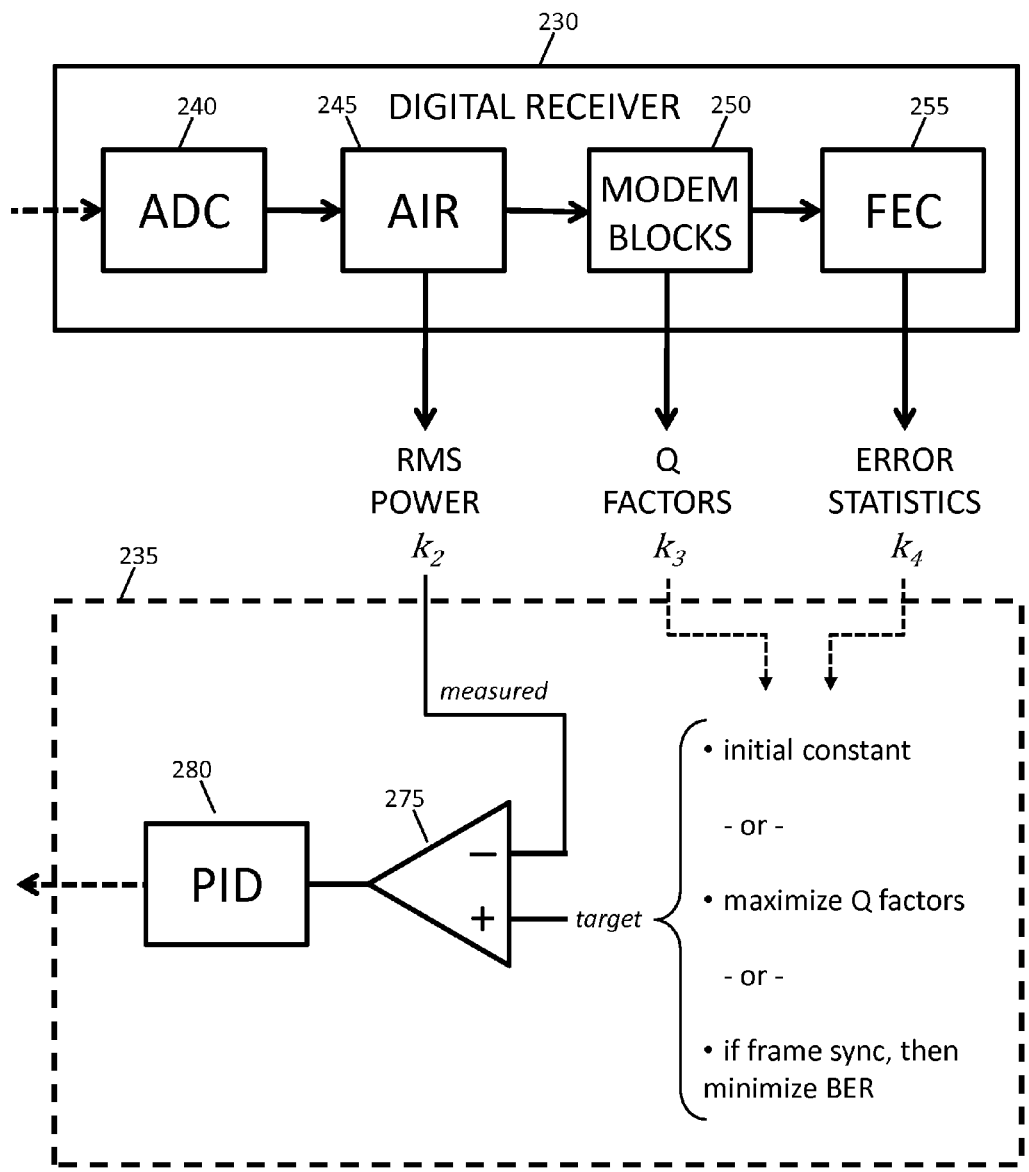
FIG. 2 is a block diagram of a digital receiver including analog impairment removal, modem and forward error correction blocks.

FIG. 2 is a block diagram of a digital receiver including analog impairment removal, modem and forward error correction blocks. In FIG. 2, digital receiver 230 includes an analog-to-digital converter (ADC) 240 which samples analog electrical signals from a transimpedance amplifier and sends a digital representation of those signals to an analog impairment removal (AIR) block 245. Digital signals from the AIR are then processed in modem blocks 250 and the resulting data are processed by forward error correction (FEC) block 255. The AIR, modem and FEC blocks generate internal data that may be used in a feedback loop to control transimpedance amplifier gain and thus keep the input signal level to the ADC in an optimum range.

Analog impairment removal block 245 performs digital operations including DC offset removal and digital automatic gain control. As a consequence of these and other operations, the AIR block is capable of outputting data including ADC clipping statistics, peak signal levels and root-mean-square (RMS) signal power measurements. Modem blocks 250 may include, for example, chromatic dispersion correction, timing recovery, adaptive equalization, carrier phase estimation, and slicing among other functions. Information from the modem blocks can be used to estimate Q-factors or related quantities such as error vector magnitude or received constellation error. (Loosely speaking, Q-factors extend signal-to-noise ratio (SNR) concepts to digital systems which employ two or more symbols to encode data.) Forward error correction block 255 analyzes redundant data in a received data stream to correct errors. As a consequence of these operations the FEC block is capable of outputting data including error statistics which can be used to estimate bit-error rate. Bit-error rate (BER) is the final performance parameter of a high-speed coherent optical receiver.

Relative weights may be placed on various feedback data, such as AIR clipping statistics, peak signal levels and RMS signal power, Q-factors, error vector magnitude and received constellation error, and FEC statistics. These feedback weights can change with time and may be different for different operating conditions. FIG. 2 outlines an example of weighting. RMS signal power which is a function of AIR data (i.e. RMS power=$f_2$(AIR data)) is weighted by $k_2$. Similarly, Q-factors are weighted by $k_3$ and FEC error statistics are weighted by $k_4$.

Feedback data may be combined in various ways; block 235 outlines one example. Here measured RMS power is compared to a target value by differential amplifier 275. The result is sent to proportional-integral-differential (PID) controller 280. Both differential amplifier 275 and PID controller 280 may be implemented in software running on a digital signal processing chip as an example.

When feedback block 235 is part of a feedback loop as discussed below in connection with FIG. 3, its effect is to drive the RMS signal power closer to the target value. The target RMS signal power may be determined in different ways. For example, it may be an initial constant value. During startup (e.g. after a power cycle) the initial constant value may be the last target value that was in use before power was removed. Alternatively, the target value may be determined by testing different targets and observing the resulting changes in Q-factors. The target that maximizes Q-factor is preferred. If reliable FEC statistics are available, e.g. if a frame sync is detected, then the target value may be determined by testing different targets and observing the resulting changes in BER. The target that minimizes BER is preferred. Still another variation is to use Q-factors or FEC statistics without data from an AIR block.

In general, as signals propagate from the AIR block to the modem blocks to the FEC block, information about the signals becomes more precise and more germane to BER. The tradeoff is that more precise and accurate information takes longer to generate and is not always available. When possible, more accurate (but slower) sources of information are used to set target values (equivalently, "set points") for less accurate (but faster) feedback measurements. Thus the variable feedback topologies outlined in FIG. 2 are part of a flexible, layered, automatic gain control strategy.

Figure 3:
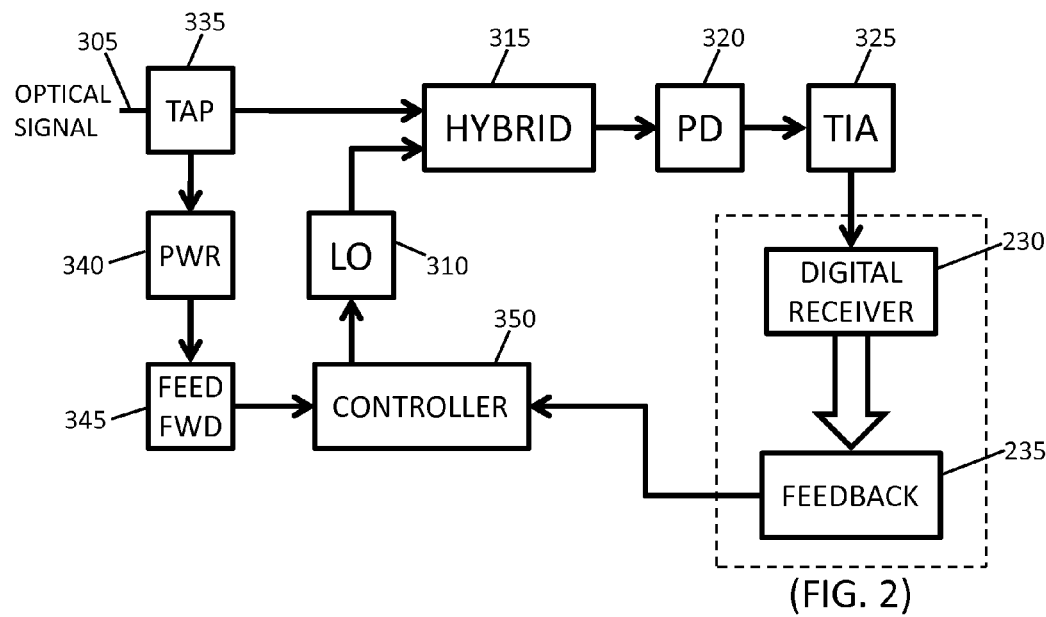
FIG. 3 is a block diagram of a coherent optical receiver with feed-forward and feedback local oscillator power control.

As a first example of the use of digital receiver feedback, FIG. 3 is a block diagram of a coherent optical receiver with feed-forward and feedback local oscillator power control. In FIG. 3, incoming optical signal 305 and local oscillator (LO) optical signal 310 are inputs to optical hybrid mixer 315. The optical outputs of the hybrid are converted to electrical signals by photodetectors 320 and the electrical signals are amplified by transimpedance amplifiers 325 before being sent to digital data receiver 230 for demodulation and decoding.

Tap 335 splits off a small fraction of the incoming optical signal for power measurement by photodetector and power measuring block 340. The power measurement from block 340 is then sent to feed-forward controller 345. Controller 350 combines digital feedback 235 from digital receiver 230 with feed-forward signals from controller 345. Controller 350 may combine its inputs in various ways to form an LO optical power command for a laser within LO 310. For example the power of the local oscillator may have the form:

$$P_{LO}=k_1 f_1(P_{SIG})[1+k_2 f_2(\text{AIR data})+k_3 f_3(Q \text{ factors})+ \\ k_4 f_4(\text{FEC data})] \qquad (1)$$

An alternate form is:

$$P_{LO}=k_1 f_1(P_{SIG})+k_2 f_2(\text{AIR data})+k_3 f_3(Q \text{ factors})+k_4 f_4 \\ (\text{FEC data}) \qquad (2)$$

In the expressions above, $P_{LO}$ is the optical local oscillator signal power, $P_{SIG}$ is the power of the incoming optical signal, AIR data is feedback data from the analog impairment removal block, Q factors are derived in modem blocks, and FEC data is feedback data from the forward error correction block of digital receiver 230. Equation (1) is preferred when correcting slope errors in local oscillator power while equation (2) is more effective for offset errors.

Equations (1) and (2) include relative weighting factors $k_1$, $k_2$, $k_3$, $k_4$. The values of these weighting factors may be adjusted to tune the characteristics of the overall feedback system. When one or more of the weighting factors are set to zero, for example, the corresponding feedback information is "turned off". Table 1 shows examples of feedback modes having different weighting factors:

TABLE 1

Weighting factors in various feedback modes.

| Mode | $k_1$ | $k_2$ | $k_3$ | $k_4$ |
|------|-------|-------|-------|-------|
| A | 1 | 0 | 0 | 0 |
| B | 1 | ≠0 | 0 | 0 |
| C | 1 | ≠0 | ≠0 | 0 |
| D | 1 | ≠0 | 0 | ≠0 |
| E | 1 | 0 | ≠0 | 0 |
| F | 1 | 0 | 0 | ≠0 |

An AGC system may switch between modes, especially during startup from a power-off state. For example, a system may start in mode A, which relies only on feed-forward corrections, for a short time before switching to mode B, which introduces feedback based on RMS power measured in an AIR block. Switching from mode B to mode C or mode D introduces fine tuning based on Q-factors or FEC statistics, respectively. Normally Q-factors and FEC statistics are not used at the same time. If no AIR block information is available, or if the system does not contain an AIR block, then mode E or F may be used to introduce fine tuning based on Q-factors or FEC statistics. Other weighting combinations are, of course, possible.

The coherent optical receiver of FIG. 3 may use its fast feed-forward loop (i.e. 335, 340, 345, 350, 310) to adjust LO power in response to fast incoming signal power transients and its slower feedback loop (i.e. 315, 320, 325, 230, 235, 350, 310) to adjust LO power in response to longer term drifts.

We turn now to feedback systems for transimpedance amplifier automatic gain control. These systems may be used separately or in combination with the local oscillator power control systems described above. As noted above, the figures depict only one signal path when several parallel paths for I and Q components of X and Y polarizations may exist. For example, a typical system includes four transimpedance amplifiers (TIAs), one each for $X_I$, $X_Q$, $Y_I$ and $Y_Q$. Similarly, Q-factors and FEC statistics may be calculated for each polarization. Thus a Q-factor may be $Q_X$, not just Q; and FEC statistics may be $FEC_X$ or $FEC_{X+Y}$, corresponding to statistics based on only X polarization data or both X and Y polarization data, respectively. Despite the complexity that would ensue from writing out all the possible combinations of AIR, modem, or FEC data from I and Q components of X and Y polarization signals, the basic principles remain the same as those illustrated in the figures for only one signal path.

Figure 4:
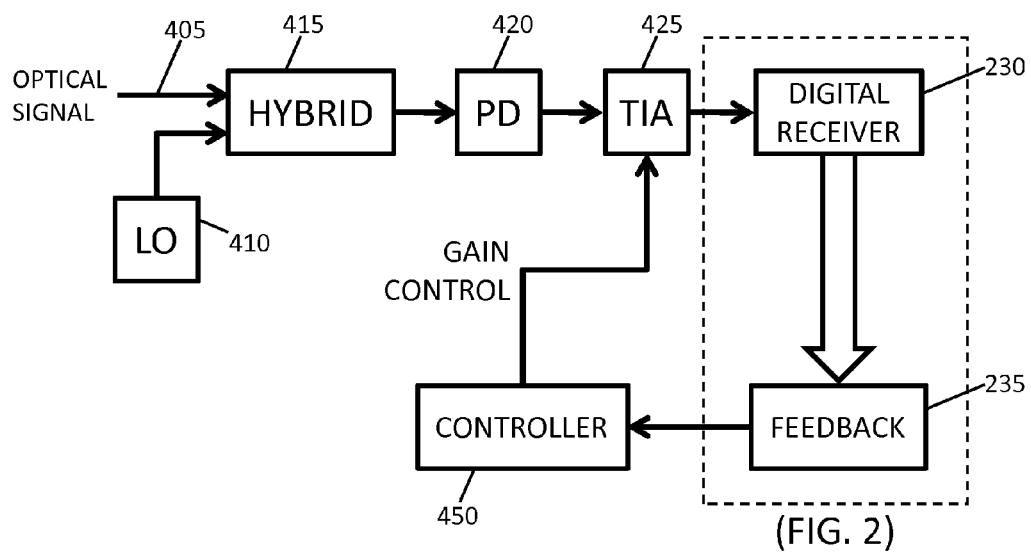
FIG. 4 is a block diagram of a coherent optical receiver with feedback transimpedance amplifier gain control.

FIG. 4 is a block diagram of a coherent optical receiver with feedback transimpedance amplifier gain control. In FIG. 4, incoming optical signal 405 and local oscillator (LO) optical signal 410 are inputs to optical hybrid mixer 415. The optical outputs of the hybrid are converted to electrical signals by photodetectors 420 and the electrical signals are amplified by transimpedance amplifiers 425 before being sent to digital data receiver 230 for demodulation and decoding. Feedback data 235 from the digital data receiver is used by controller 450 to set the gain of transimpedance amplifier 425.

In the system of FIG. 4, digital receiver feedback 235 represents all of the possible feedback possibilities illustrated in FIG. 2 and described above. Clipping statistics, peak levels, RMS power and other information from an AIR block in the digital receiver may be used as a feedback source to control transimpedance amplifier gain. When Q-factors, error vector magnitude, received constellation errors or FEC statistics are available, they can be used to optimize the transimpedance amplifier gain to minimize bit-error rate. In most cases, Q-factor or FEC feedback provides more precise, but slower gain corrections.

Figure 5:
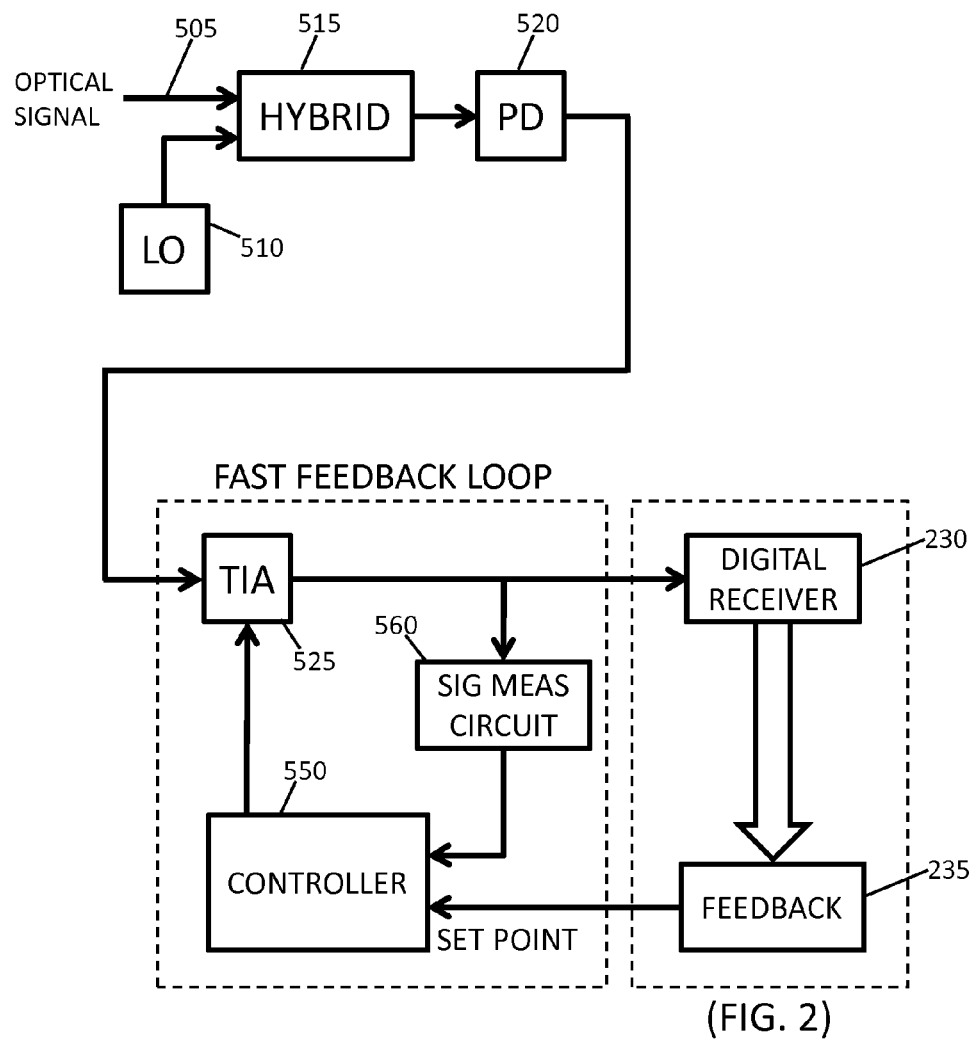
FIG. 5 is a block diagram of a coherent optical receiver with feedback transimpedance amplifier gain control having both fast and slow feedback loops.

The system of FIG. 4 may be extended by providing an additional hardware control loop in the electrical domain. This loop compensates for fast transients in received signal power. FIG. 5 is a block diagram of a coherent optical receiver with feedback transimpedance amplifier gain control having both fast and slow feedback loops.

In FIG. 5, incoming optical signal 505 and local oscillator (LO) optical signal 510 are inputs to optical hybrid mixer 515. The optical outputs of the hybrid are converted to electrical signals by photodetectors 520 and the electrical signals are amplified by transimpedance amplifiers 525 before being sent to digital data receiver 230 for demodulation and decoding. Feedback data 235 from the digital data receiver is used by controller 550 to set the gain of transimpedance amplifier 525.

A fast (e.g. 100 μs-100 ms) feedback loop, implemented in electrical hardware, is formed by transimpedance amplifier 525, signal measuring circuit 560, and controller 550. The set-point for the loop is provided by feedback 235 from digital receiver 230. In practical implementations, the fast feedback loop represented by 525, 560, and 550 is often provided as an internal feature of a transimpedance amplifier. The loop may therefore operate at high speed, but is often subject to drift and gain errors. The use of AIR, modem or FEC feedback to provide a set-point for the fast feedback loop removes the drift and gain error limitations of the fast hardware feedback loop.

The high-speed coherent optical receiver of FIG. 5 may also include optical local oscillator feed-forward and/or feedback power control as illustrated in FIG. 3. LO power and transimpedance gain controls in the receiver of FIG. 5 help keep signal inputs to transimpedance amplifiers and analog-to-digital converters in the system within predefined, acceptable ranges. The resulting immunity from fluctuations in input optical signal level improves the overall performance of the receiver by minimizing its bit-error rate.

Figure 6:
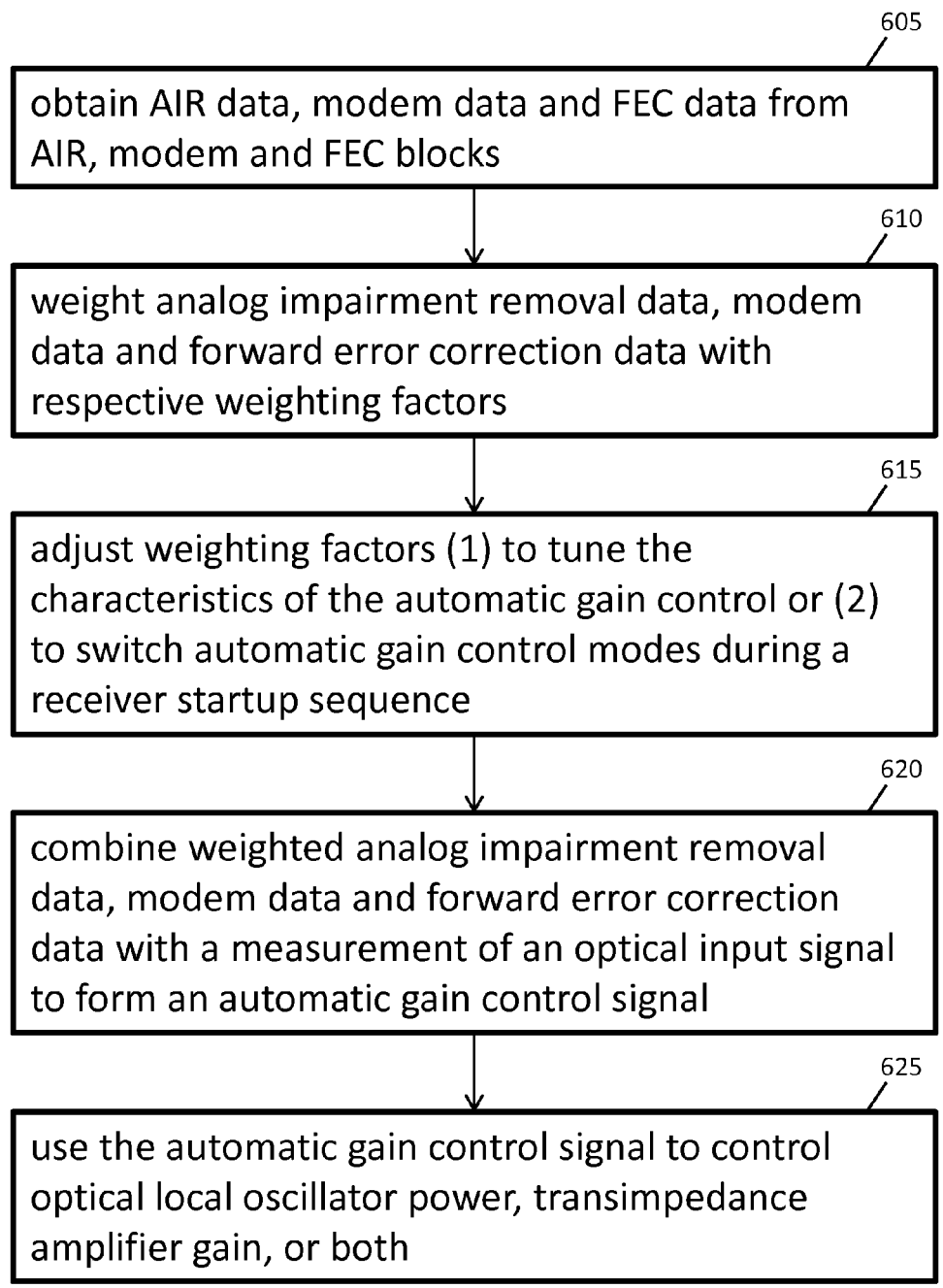
FIG. 6 is a flow chart for a method for providing automatic gain control in a high-speed coherent optical receiver.

FIG. 6 is a flow chart for an example of a method used to provide automatic gain control in a high-speed coherent optical receiver. At 605, analog impairment removal data, modem data and forward error correction data is obtained from analog impairment removal, modem and forward error correction blocks, respectively, of the receiver. At 610, analog impairment removal data, modem data and forward error correction data are weighted with respective weighting factors. At 615, the weighting factors are adjusted (1) to tune the characteristics of the automatic gain control or (2) to switch automatic gain control modes during a receiver startup sequence. At 620, weighted analog impairment removal data, modem data and forward error correction data are combined with a measurement of an optical input signal to form an automatic gain control signal. At 625, the automatic gain control signal is used to control optical local oscillator power, transimpedance amplifier gain, or both.

In conclusion, feed-forward and feedback strategies are used to control LO power and/or transimpedance amplifier gain in a high-speed digital, coherent optical receiver. Feedback data are derived at different stages in the receiver. Downstream data, such as Q-factors or bit error rate may be used to set target levels for faster feedback loops based on upstream data from an AIR block.

The techniques described in this document can be implemented using an apparatus, a method, a system, or any combination of an apparatus, methods, and systems. The high speeds for which coherent optical receivers are often designed suggest that functional blocks (e.g. AIR, modem, FEC) and control blocks be implemented as parts of a dedicated hardware chip. However it is also possible to implement receiver blocks in field programmable gate arrays, firmware or even software, depending upon the specific application.

Implementations of the subject matter and the operations described in this document can be configured in digital electronic circuitry, or in computer software, firmware, or hardware, including the structures disclosed in this document and their structural equivalents, or in combinations of one or more of them. For a hardware implementation, the embodiments (or modules thereof) can be implemented within one or more application specific integrated circuits (ASICs), mixed signal circuits, digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents.

While this document contains many specific implementation details, these should not be construed as limitations on the scope of any inventions or of what may be claimed, but rather as descriptions of features specific to particular implementations of particular inventions. Certain features that are described in this document in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The above description of the disclosed implementations is provided to enable any person skilled in the art to make or use the disclosure. Various modifications to these implementations will be readily apparent to those skilled in the art, and the principles defined herein may be applied to other implementations without departing from the scope of the disclosure. Thus, the disclosure is not intended to be limited to the implementations shown herein but is to be accorded the widest scope consistent with the principles and novel features disclosed herein.

What is claimed is:

1. A high-speed coherent optical receiver comprising:
    an optical hybrid that mixes an optical input signal and an optical local oscillator signal;
    a photodetector that converts optical output from the optical hybrid into electrical signals;
    a transimpedance amplifier that amplifies the electrical signals, the transimpedance amplifier having a predefined input signal range;
    a digital receiver that generates one or more feedback signals using the amplified electrical signals;
    a feedback block that weights the one or more feedback signals;
    a tap that splits off a fraction of the optical input signal before it is input to the optical hybrid;
    a power measuring block, that measures the split off optical input signal;
    a feedforward controller that generates feed-forward signals based in part on the measured power for the split off optical input signal; and
    a controller block that generates a power control signal using both the feed-forward signals and the weighted one or more feedback signals, and the power control signal adjusts the local oscillator signal such that the electrical signals from the photodetector remain within the predefined input signal range of the transimpedance amplifier when the power of the optical input signal varies.

2. The high-speed coherent optical receiver of claim 1 wherein:
    the digital receiver comprises analog-to-digital converter, analog impairment removal, and modem blocks;
    the analog impairment removal block provides a feedback signal comprising analog impairment statistics; and
    the analog impairment statistics are used by the controller block as an additional input when generating the power control signal to adjust the local oscillator signal.

3. The high-speed coherent optical receiver of claim 2 wherein:
    the analog-to-digital converter, analog impairment removal, and modem blocks operate on four signal tributaries corresponding to in-phase (I) and quadrature (Q) components of signals carried in X and Y polarizations of the optical input signal.

4. The high-speed coherent optical receiver of claim 2 wherein:
    the analog impairment statistics comprise analog-to-digital converter clipping statistics, peak signal levels, or root-mean-square signal level.

5. The high-speed coherent optical receiver of claim 2 wherein:
    the modem blocks provide Q-factors; and the Q-factors are used by the controller block as an additional input when generating the power control signal to adjust the local oscillator signal.

6. The high-speed coherent optical receiver of claim 2 wherein:
the digital receiver further comprises a forward-error-correction block that provides another feedback signal that comprises error statistics; and
the error statistics are combined with the analog impairment statistics for use by the controller block as an additional input when generating the power control signal to adjust the local oscillator signal.

7. The high-speed coherent optical receiver of claim 6 wherein:
the forward-error-correction block operates on four signal tributaries corresponding to in-phase (I) and quadrature (Q) components of signals carried in X and Y polarizations of the optical input signal.

8. The high-speed coherent optical receiver of claim 2 wherein:
the digital receiver further comprises a forward-error-correction block that provides another feedback signal that comprises error statistics; and
information from the analog impairment removal, modem and forward-error-correction blocks is represented as a weighted sum that the controller multiplies by the split off optical input signal to form the power control signal to adjust the local oscillator signal.

9. The high-speed coherent optical receiver of claim 8 wherein:
the weighted sum comprises coefficients that change according to receiver operating mode.

10. The high-speed coherent optical receiver of claim 2 wherein:
the digital receiver further comprises a forward-error-correction block that provides another feedback signal that comprises error statistics; and
information from the analog impairment removal, modem and forward-error-correction blocks is represented as a weighted sum that the controller adds to the split off optical input signal to form the power control signal to adjust the local oscillator signal.

11. The high-speed coherent optical receiver of claim 10 wherein:
the weighted sum comprises coefficients that change according to receiver operating mode.

12. A high-speed coherent optical receiver comprising:
an optical hybrid that mixes an optical input signal and an optical local oscillator signal;
a photodetector that converts optical output from the optical hybrid into electrical signals;
a transimpedance amplifier that amplifies the electrical signals for input into a digital receiver that demodulates and decodes the amplified electrical signals, the digital receiver comprising:
an analog-to-digital converter, the analog-to-digital converter having a predefined input signal range,
an analog impairment removal block that provides analog impairment statistics, and the analog impairment statistics comprise analog-to-digital converter clipping statistics, peak signal levels, or root-mean-square signal power, and
modem blocks, wherein the modem blocks provide quality factors ("Q factors"); and
a controller that uses the analog impairment statistics and the Q-factors to generate a transimpedance amplifier gain control signal such that the amplified electrical signals remain within the predefined input signal range of the analog-to-digital converter when power of the optical input signal varies.

13. The high-speed coherent optical receiver of claim 12 wherein:
the analog-to-digital converter, analog impairment removal, and modem blocks operate on four signal tributaries corresponding to in-phase (I) and quadrature (Q) components of signals carried in X and Y polarizations of the optical input signal.

14. The high-speed coherent optical receiver of claim 12 wherein:
the modem blocks performs one or more functions selected from a group comprising: chromatic dispersion correction, timing recovery, adaptive equalization, carrier phase estimation, and slicing.

15. The high-speed coherent optical receiver of claim 12 wherein:
the digital receiver further comprises a forward-error-correction block that provides error statistics; and
the error statistics are combined with the analog impairment statistics for use by the controller as an additional input when generating the transimpedance amplifier gain control signal.

16. The high-speed coherent optical receiver of claim 15 wherein:
the forward-error-correction block operates on four signal tributaries corresponding to in-phase (I) and quadrature (Q) components of signals carried in X and Y polarizations of the optical input signal.

17. The high-speed coherent optical receiver of claim 12 further comprising:
a signal measuring circuit that provides the controller with a direct measurement of the amplified electrical signals.

18. The high-speed coherent optical receiver of claim 17 wherein:
the analog impairment statistics are used to provide a setpoint for the controller.

19. A method for providing automatic gain control in a high-speed coherent optical receiver comprising:
obtaining analog impairment removal data, modem data and forward error correction data from analog impairment removal, modem and forward error correction blocks, respectively, of the receiver;
weighting the obtained analog impairment removal data, modem data and forward error correction data with respective weighting factors;
adjusting the weighting factors (1) to tune characteristics of the automatic gain control or (2) to switch automatic gain control modes during a receiver startup sequence;
combining the weighted analog impairment removal data, modem data and forward error correction data with a measurement of an optical input signal to form an automatic gain control signal; and
using the automatic gain control signal to control optical local oscillator power, transimpedance amplifier gain, or both.

* * * * *

UNITED STATES PATENT AND TRADEMARK OFFICE
CERTIFICATE OF CORRECTION

| | |
|---|---|
| PATENT NO. | : 8,768,178 B2 |
| APPLICATION NO. | : 13/233969 |
| DATED | : July 1, 2014 |
| INVENTOR(S) | : Sunil Kumar Singh Khatana et al. |

It is certified that error appears in the above-identified patent and that said Letters Patent is hereby corrected as shown below:

In the Claims

Claim 12, column 10, line 2, "("Q factors)" should read --(Q factors)--

Signed and Sealed this
Twenty-sixth Day of May, 2015

Michelle K. Lee
*Director of the United States Patent and Trademark Office*